(No Model.)
J. HANSEL.
CORN HUSKING CHAIR.
No. 281,266. Patented July 17, 1883.
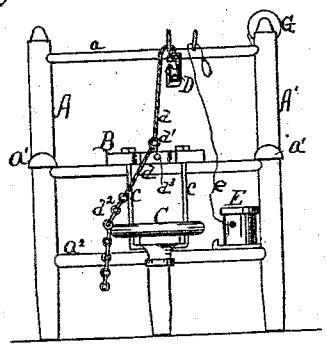
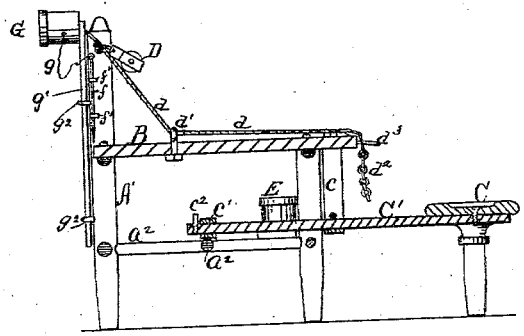
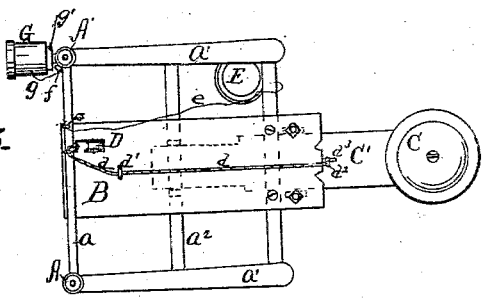
Witnesses—
J. Everett Brown
H. W. Munday.
Inventor—
John Hansel,
by Munday Evarts & Adcock
his attys

UNITED STATES PATENT OFFICE.

JOHN HANSEL, OF YELLOW SPRINGS, OHIO.

CORN-HUSKING CHAIR.

SPECIFICATION forming part of Letters Patent No. 281,266, dated July 17, 1883.

Application filed July 24, 1882. (No model.)

*To all whom it may concern:*

Be it known that I, JOHN HANSEL, of Yellow Springs, Greene county, in the State of Ohio, have invented certain new and useful Improvements in Corn-Husking Chairs; and I do hereby declare that the following is a full, clear, and exact description of my invention, which will enable others skilled in the art to which it appertains to make and use the same, reference being had to the accompanying drawings, forming a part of this specification.

This invention is a portable device for use by the farmer in the field in husking corn and binding the stalks preparatory to shocking the same.

It consists of a frame or structure adapted to be readily carried in the hand, and provided with the following features: a seat for the user, a table adapted to support enough stalks to form a bundle of fodder, and a compress device, whereby the stalks may be compressed and held while they are being tied into a bundle, all substantially as hereinafter set forth.

In the accompanying drawings, Figure 1 is a front view of my invention. Fig. 2 is a central vertical section of the same upon a line extending from front to rear of the apparatus. Fig. 3 is a plan view of the apparatus. Similar letters of reference indicate like parts.

In the drawings, A and A' represent the uprights, and $a$ $a'$ $a^2$ the horizontal parts of the frame of my apparatus. As will be noticed, the frame may be made to resemble very much the skeleton of an ordinary high-backed arm-chair. To this frame is secured a table, B, about upon a level with the arms $a'$. This table is adapted to hold a quantity of stalks equal to the number thereof usually bound up in a bundle preparatory to shocking. When the stalks are laid upon the table, the user draws out from under the table the stool C, which is secured to the frame by a sliding piece, C', held in a depending loop, $c$, secured to the table, and a loop, $c'$, upon the cross-brace $a^2$, a pin, $c^2$, preventing its sliding beyond the embrace of the loops. The user then seats himself and husks the corn which is on the table. He next proceeds to compress the stalks, which he does by taking the pulley or sheave D from the pin where it hangs upon the upper round, $a$, inserting the front end of the rope $d$ in the sheave, the other end being already fast thereto, and strains the rope until the stalks have been sufficiently compressed. It will be understood that the rope lies upon the table when the corn is laid thereon, and in order that it may always be in place I pass it through an eye, $d'$, inserted in the table. To retain the tension obtained upon the rope, I provide the rope with a chain, $d^2$, at its free end, the links whereof afford convenience of attachment to a pin, $d^3$, upon the front end of the table. A cord-receptacle, E, is also provided, as shown, and the end of the cord $e$ therefrom is kept at all times between the tying operations extended under the corn and suspended upon said upper round, $a$, so as to be ready to be drawn around the corn at the proper time. This drawing of the cord around the compressed bundle and the tying of the same is the next operation. When this is done, the cord is severed, the compress released, and the bundle thrown off. If necessary, the chair is moved along from point to point in the field as the bundles are bound and the stalks are disposed of. When enough bundles to form a shock have been made, they may be bound together with the aid of my apparatus, as follows: The bundles being set up, the chair is moved up to them. The operator, standing upon the chair, takes the needle $f$ from its holding-staples $f'$ and thrusts it into the shock. The end of the cord $g$, threaded in the needle, is thus temporarily held while the operator moves the cord-receptacle G, by the aid of the staff $g'$, upon which it is mounted, around the shock, paying out the cord as it goes. When not in use, the staff is inserted in the staples $g^2$ upon one of the uprights. The shock formed as described will resist storms very effectually.

I claim—

The portable device for use in corn-gathering, consisting of a frame, A A' $a$ $a'$ $a^2$, a table, B, a seat, C, and a compressing-rope, all combined and operating substantially as set forth.

JOHN HANSEL.

Witnesses:
J. W. HAMILTON,
ALLIE HAMILTON.